(12) United States Patent
Springer

(10) Patent No.: US 12,407,538 B2
(45) Date of Patent: Sep. 2, 2025

(54) INDEPENDENTLY CONFIGURABLE ANNOTATION LAYERS

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/471,918

(22) Filed: Sep. 21, 2023

(65) Prior Publication Data
US 2024/0015042 A1 Jan. 11, 2024

Related U.S. Application Data

(63) Continuation of application No. 17/562,264, filed on Dec. 27, 2021, now Pat. No. 11,799,677, which is a
(Continued)

(51) Int. Cl.
*H04L 12/18* (2006.01)
*H04L 65/401* (2022.01)
(Continued)

(52) U.S. Cl.
CPC ...... *H04L 12/1822* (2013.01); *H04L 65/4015* (2013.01); *H04L 65/403* (2013.01); *H04N 7/147* (2013.01); *H04N 7/152* (2013.01)

(58) Field of Classification Search
CPC ......... H04L 12/00; H04L 12/02; H04L 12/16; H04L 12/18; H04L 12/1813–1822;
(Continued)

(56) References Cited

U.S. PATENT DOCUMENTS 8,380,866 B2 2/2013 Savitzky et al.
8,639,032 B1 * 1/2014 Voorhees ............... G06V 20/49
382/187

(Continued)

FOREIGN PATENT DOCUMENTS

JP 3846666 B2 * 11/2006 ......... H04L 12/1813

OTHER PUBLICATIONS

"Annotate Your shared Files As You Discuss Them", Kaltura Knowledge Center (Year: 2020).
(Continued)

*Primary Examiner* — Boris D Grijalva Lobos
(74) *Attorney, Agent, or Firm* — Young Basile Hanlon & MacFarlane, P.C.

(57) ABSTRACT

Methods, systems, and apparatus, including computer programs encoded on computer storage media relate to a method for providing multi-point video presentations with live annotations within a communication platform. First, the system receives video feeds depicting imagery of a number of users. The system then determines a boundary about each user in the video feeds, with the boundaries each having an interior portion and an exterior portion. The system provides a media background for the exterior portions, then generates a composite video for each of the feeds. The system then determines that one or more client devices have annotation permissions, and receives one or more annotation inputs corresponding to at least one of the composite videos. Finally, the system updates at least one of the composite videos to additionally depict the annotation inputs within a third layer.

20 Claims, 11 Drawing Sheets

Related U.S. Application Data continuation of application No. 17/163,444, filed on Jan. 30, 2021, now Pat. No. 11,265,181.

(51) Int. Cl.
*H04L 65/403* (2022.01)
*H04N 7/14* (2006.01)
*H04N 7/15* (2006.01)

(58) Field of Classification Search
CPC ..... H04L 65/00; H04L 65/40; H04L 65/4015; H04L 65/4007; H04L 65/403; H04N 7/00; H04N 7/14; H04N 7/141; H04N 7/147; H04N 7/15; H04N 7/152
See application file for complete search history.

(56) References Cited

U.S. PATENT DOCUMENTS

| | | | |
|---|---|---|---|
| 10,880,496 B1 | 12/2020 | Voss et al. | |
| 10,986,311 B1* | 4/2021 | Noland | G06V 40/10 |
| 11,134,217 B1 | 9/2021 | Goel | |
| 11,265,181 B1 | 3/2022 | Springer | |
| 11,743,417 B2* | 8/2023 | Springer | H04N 21/6587 |
| | | | 348/14.07 |
| 11,799,677 B2* | 10/2023 | Springer | H04N 21/44008 |
| 2008/0077953 A1* | 3/2008 | Fernandez | H04N 7/18 |
| | | | 725/32 |
| 2008/0091778 A1 | 4/2008 | Ivashin et al. | |
| 2010/0037151 A1 | 2/2010 | Ackerman et al. | |
| 2012/0092435 A1 | 4/2012 | Wohlert | |
| 2013/0339847 A1 | 12/2013 | Bartek et al. | |
| 2014/0178050 A1* | 6/2014 | St. Clair | H04N 5/91 |
| | | | 386/285 |
| 2016/0072862 A1 | 3/2016 | Bader-Natal et al. | |
| 2016/0072863 A1 | 3/2016 | Wu et al. | |
| 2016/0291814 A1 | 10/2016 | Pigat et al. | |
| 2016/0353057 A1 | 12/2016 | Chung et al. | |
| 2017/0039867 A1 | 2/2017 | Fieldman | |
| 2017/0118271 A1* | 4/2017 | Reyes | H04L 65/1089 |
| 2018/0011627 A1 | 1/2018 | Siracusano, Jr. | |
| 2018/0376104 A1 | 12/2018 | Li | |
| 2019/0147402 A1 | 5/2019 | Sitrick et al. | |
| 2019/0260966 A1 | 8/2019 | Leatherman, III | |
| 2020/0273359 A1 | 8/2020 | Stetson | |
| 2022/0109810 A1* | 4/2022 | Kancharlawar | H04N 7/157 |
| 2022/0239847 A1* | 7/2022 | Swierk | G06N 3/084 |

OTHER PUBLICATIONS

Bonnie, "Draw annotation on Twillio video Chat", Stack Overflow (Year: 2016).

"Zoom Screensharing: how to share content", Securevideo.com (Year: 2016).

International Search Report in PCT International Application No. PCT/US2021/064240, mailed Apr. 11, 2022.

Lienhard et al., "Multi-Layer Recording as a New Concept of Combining Lecture Recording and Students' Handwritten notes", ACM (Year: 2002).

* cited by examiner

INDEPENDENTLY CONFIGURABLE ANNOTATION LAYERS

CROSS-REFERENCE TO RELATED APPLICATION(S)

This application is a continuation of U.S. patent application Ser. No. 17/562,264, filed Dec. 27, 2021, which is a continuation of U.S. patent application Ser. No. 17/163,444, filed Jan. 30, 2021, the entire disclosures of which are hereby incorporated by reference.

FIELD OF INVENTION

The present invention relates generally to digital communication, and more particularly, to systems and methods providing for multi-point video presentations with live annotation within a video communication platform.

BACKGROUND

One of the most exciting technological breakthroughs in recent decades has involved the ability of a group of people to meet remotely within a virtual conference room or meetup room, with one or more of the participants sharing video which is streamed in real time. Within the context of online education, for example, classes can be held remotely between an instructor and several students, at least some of whom are physically and geographically separated from the teacher and/or one another. Within a so-called "hybrid classroom" environment, the teacher may teach before a classroom of near-end students who are physically located in the same classroom as the instructor, while a number of far-end students watches and participates remotely.

The instructor typically has a setup wherein video of the instructor is generated and transmitted to far-end students within a virtual classroom that is hosted on a video communication platform. In some cases, the instructor may have a conventional whiteboard (or blackboard) behind her, as is typical within physical classrooms. The instructor writes on this whiteboard as a teaching tool. In some cases, the setup involves two cameras: one trained on the instructor's face, and the other trained on the whiteboard. The video transmitted to the far-end students can thus be switched automatically and/or manually between the two different views, depending on context. Additionally, one or more cameras can be adjusted to allow near-end students to give presentations, answer questions, or otherwise participate and interact with the teacher. Similarly, far-end students may share video feed of themselves presenting remotely as part of classroom activities.

There are significant drawbacks to these approaches. In the case of a setup where one video shows both the instructor and the whiteboard, the instructor must turn her back to the students in order to write on the whiteboard. Also, while standing or pacing in front of the whiteboard, the instructor can sometimes obscure the writing with her physical presence. In the case of a setup with two cameras trained on the instructor and the whiteboard, instructors have found it difficult to share the whiteboard meaningfully in addition to the instructor's own video. Using the whiteboard hides the instructor's face, and conversely, showing the instructor's face hides the whiteboard. This leads to far-end participants having limited instruction. Prior solutions which cater to the far-end students have unfortunately been so technologically intensive, including requiring expensive specialized hardware, that they limit instruction for near-end participants in a hybrid classroom.

Students presenting before the class introduces additional challenges. Just as it is difficult or impossible for teachers to use the whiteboard while still presenting themselves clearly, students are often unable to simultaneously present materials while showing themselves. In addition, a teacher may wish to mark up the student's presentations in order to point to some element in particular or to illustrate some concept, but is unable to do so. Students similarly cannot peer review one another's' work in group settings and still present their faces, which is often crucial to collaboration between students.

Thus, there is a need in the field of digital communication to create a new and useful system and method for providing multi-point video presentations with live annotation within a video communication platform. The source of the problem, as discovered by the inventors, is a lack of ability for potentially multiple composite videos to be presented with annotation layers for one or more annotators during a live video session.

SUMMARY

The invention overcomes the existing problems by allowing multi-point presentations with live annotations within a video communication platform. Multiple presenters with devices that allow audio and video inputs and outputs are able to leverage annotation tools to draw or otherwise annotate over a live or recorded presentations or similar videos which are displayed on the device. In this way, presenters can produce live content by combining live performance or instruction with written content. In a hybrid classroom, for example, this can cater to both near-end and far-end students, allowing for collaboration between both with annotation, media presentation, and imagery of the users themselves all potentially visible simultaneously within a given composite video that is presented. In non-hybrid classrooms, students can benefit from such an approach whether they are near-end or far-end students, as it provides a rich media environment with different elements being accessible and controllable in a systematic and understandable fashion.

Generally speaking, the approach includes generating a composite video for each of a number of video feeds associated with users within a video session. A media background is generated for each video feed and can be used to present materials (such as, e.g., presentation slides) and/or eliminate visual distractions behind participants. One or more presenters can then be seen on video during the session. An annotation layer overlaid on top of the user's image allows for a presenter to produce live written annotations in conjunction with their own video presentations, particularly when accessing a "self-view" interface on their client device. In some use cases, this combination of visual elements can be reproduced both locally for near-end participants, as well as remotely for far-end participants, thus democratizing the instructional experience. In some use cases, a presenter may present while one or more participants watching may be able to annotate over the presenter's view, given the user accounts associated with the participants have permission rights to annotate over the presenter's video content. In some use cases, a user with host or administration-level access can designate some of the video feeds as "featured" feeds to make them more prominent or exclusively viewable on participants' screens. The user can then switch from one presenter being the focus to another, set up annotation permissions depending on the context, and control the multi-point presentation experience in other ways.

One embodiment relates to a method for providing multi-point video presentations with live annotations within a communication platform. First, the system receives video feeds depicting imagery of a number of users, with the video feeds each having multiple video frames. The system then determines a boundary about each user in the video feeds, with the boundaries each having an interior portion and an exterior portion. The system provides a media background for the exterior portions, then generates a composite video for each of the feeds which is displayed on client devices. The composite videos depict the corresponding media background in a first layer and each user from the interior portion in a second layer overlaid on top of the first layer. The system then determines that one or more client devices have annotation permissions, and receives one or more annotation inputs corresponding to at least one of the composite videos. Finally, the system updates at least one of the composite videos to additionally depict the annotation inputs within a third layer.

In some embodiments, the system can receive a request for annotation permissions from a client device which doesn't have such permissions. The system queries a user with administration or hosting permissions whether to grant the annotation permissions request, and then receives a response to the query from the user. Based on the response to the query, the system can grant the request for annotation permissions to the requesting client device.

In some embodiments, the system receives a request to annotate one of the composite videos from a client device having annotation permissions with respect to the composite video. The system then determines whether an open annotation slot is available for the requesting client device with respect to the composite video. If an open annotation slot is available, the system assigns the client device to the open annotation slot to send annotation inputs with respect to the composite video. In some embodiments, if an open annotation slot is not available, then the system sends a notification to a user with administration or hosting access that a user annotation request was denied for a composite video due to a lack of open annotation slots being available. In other embodiments, if an open annotation slot is not available, the system determines that the requesting client device has a higher annotation input priority than at least one of the client devices currently in an annotation slot for the composite video. The system then dynamically switches received annotation inputs from the lower priority client device to the higher priority requesting device.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein.

DETAILED DESCRIPTION

Figure 1A:
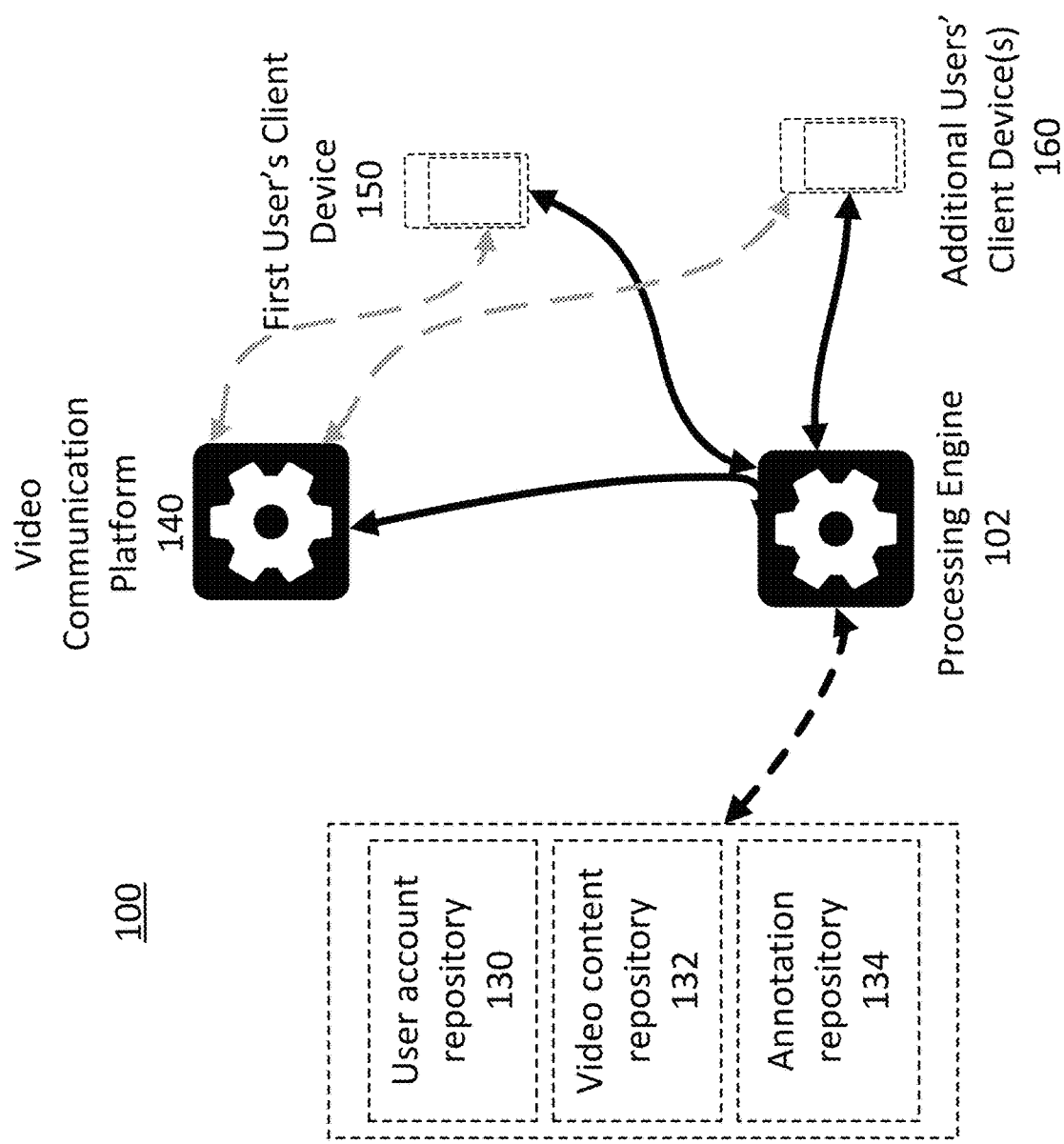
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration, a teacher in a remote learning classroom may wish to have students present final class presentations during the class, one after another. She would like to incorporate a first whiteboard for her own notes on the presentations, a second whiteboard for the presenting students if they need it, and a number of presentation documents sent by the students into her lecture. The teacher receives a setup from the school administration with one camera trained on her face and another camera trained on the whiteboard. She also receives a tablet computer where she can toggle between the two camera views manually, as well as switch to a third view sharing the presentation slides. The teacher is able to incorporate the view of herself, the view of the whiteboard, and the shared screen with the presentation slides on it, but not in a seamless way. Regarding the video feeds from the students who are presenting, she cannot arrange or control the feeds in a way that incorporates her whiteboard as well as a presenter's whiteboard, while still viewing the presentation slides and the image of the presenter.

In contrast, using the current approach, all of these aspects are accounted for to provide a seamless, media-rich environment for all participants to present or to view presentations. The teacher's administration instead provides a setup of a single camera trained on the teacher's face, and a tablet computer which shares the presentation slides. Rather than a second camera and a physical whiteboard, the teacher's tablet computer can be used to allow the teacher to provide live annotations over the image of the teacher. Meanwhile, each participating student who will be presenting can attach a set of presentation slides to be used as a media background. The presenter's image is then overlaid on top of the presentation as media background, with the presenter's previous background from the video (e.g., the presenter's bedroom or study space) being removed and replaced with a portion of the presentation background, such that the presenter appears seamlessly overlaid on top of the current presentation slide. For group presentations, multiple participants can have composite video generated in the same fashion. Meanwhile, the teacher can configure different setups for annotations over the presentations. For example, the teacher can allow annotation permissions for herself as well as the individual presenters to annotate the presentation slides during the presentations. As one presentation is switched for another, the teacher can change the annotation permissions to the new presenters, or in some use cases she can pre-assign annotation permissions for each presentation video before the meeting takes place. In some use cases, if any participant or the teacher finds the screen confusing, they can optionally remove one or more of the layers to focus on only a few elements at a time.

Many other possibilities and options can be contemplated for this use case and others, as will be described in further detail throughout.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130, video content repository 132, and/or an annotation repository 134. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, the processing engine 102 may perform the method 200 (FIG. 2A) or other method herein and, as a result, provide multi-point video presentations with live annotations within a video communication platform. In some embodiments, this may be accomplished via communication with the first user's client device, additional users' client device(s), processing engine, video communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 is configured to perform functions related to presenting and playing back video, audio, documents, annotations, and other materials within a video presentation (e.g., a virtual class, lecture, webinar, or any other suitable video presentation) on a video communication platform. The additional users' client device(s) 160 are configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130, video content repository 132, and/or annotation repository 134. The optional repositories function to store and/or maintain, respectively, user account information associated with the video communication platform 140, video content received by the video communication platform 140 for display within video presentations, and annotations, which may include media and/or messaging-based annotations. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate video presentations and/or communication between two or more parties, such as within a video conference or virtual classroom.

Figure 1B:
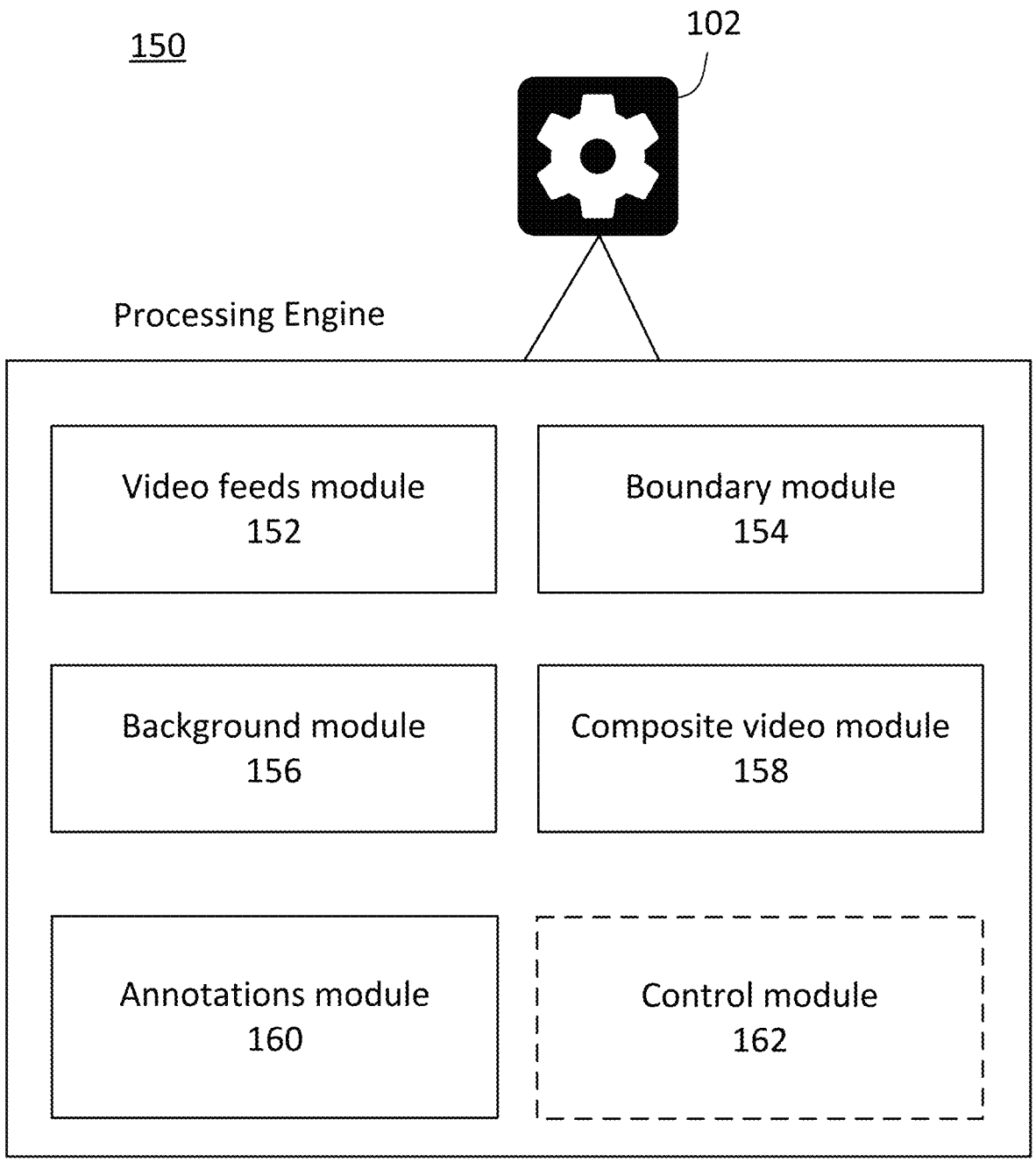
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Video feeds module 152 functions to receive video feeds depicting imagery of a number of users, with the video feeds each having multiple frames.

Boundary module 154 functions to determine a boundary about each user in the video feeds, with the boundaries each having an interior portion and an exterior portion.

Background module 156 functions to provide a media background for the exterior portion of the boundary.

Composite video module 158 functions to generate composite videos for each of the video feeds to be displayed on one or more client devices associated with additional users. The composite video may depict the corresponding media background within a first layer, and each user from the interior portion within a second layer.

Annotation module 158 functions to receive one or more annotation inputs corresponding to the composite video, with the annotation inputs being media-based and/or messaging-based.

Optional control module 162 functions to provide control over various aspects of presenting or annotating, including permissions to present and permissions to annotate one or more of the composite videos.

The above modules and their functions will be described in further detail in relation to an exemplary method below.

II. Exemplary Method

Figure 2A:
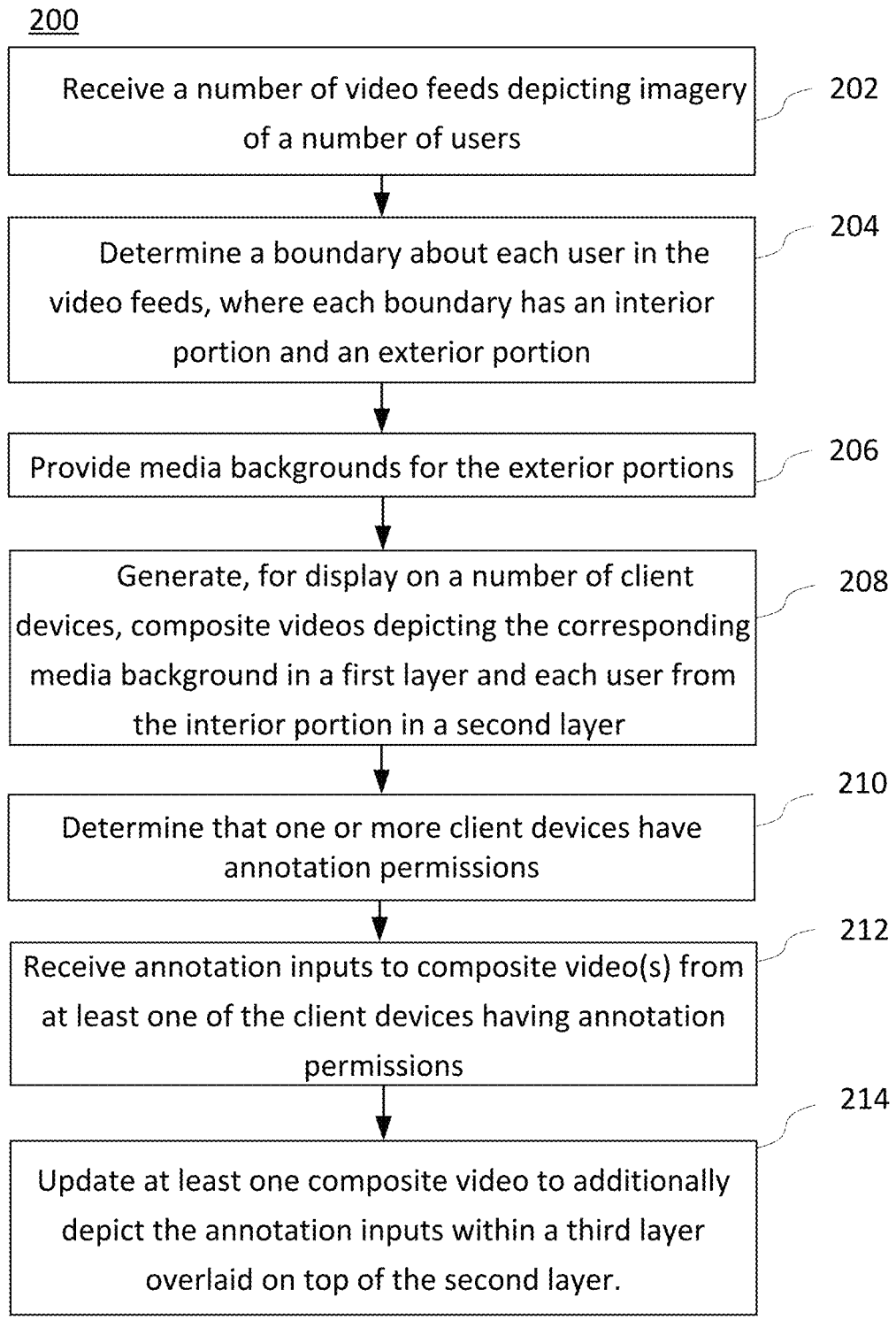
FIG. 2A is a flow chart illustrating an exemplary method 200 that may be performed in some embodiments.

FIG. 2A is a flow chart illustrating an exemplary method that may be performed in some embodiments.

At step 202, the system receives a number of video feeds depicting imagery of a number of users, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a user's client device. For example, a user may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each user and/or one or more client devices associated with each user. Thus, for example, rather than using a camera built into the client device, an external camera can be used which transmits video to the client device, or some combination of both.

In some embodiments, the users are users of a video communication platform, and are connected remotely within a virtual video communication room generated by the video communication platform. This virtual video communication room may be, e.g., a virtual classroom or lecture hall, a group room, a breakout room for subgroups of a larger group, or any other suitable video communication room which can be presented within a video communication platform.

At step 204, the system determines a boundary about each user in the video frames, where the boundary has an interior portion and an exterior portion. In some embodiments, determining the boundary may partially or fully involve "image masking" techniques and/or backdrop removal techniques, whereby an image is separated from its background. Each of the video frames is a still image depicting a user. The outline of the user is detected by the system and used as the boundary about the user. The boundary has an interior portion, consisting of everything inside of the boundary or outline of the user; and an exterior portion, consisting of everything outside of the boundary or outline of the first user. In some embodiments, the interior portion and exterior portion of the boundary each constitute layers which are separated into different images for each video frame. In various embodiments, image masking techniques used may include, e.g., layer masking, clipping mask, alpha channel masking, or any other suitable image masking techniques. In some embodiments, the boundary is updated each time the user moves, i.e., as additional video frames are received, such that the user moving around in the frame of the video leads to the boundary being updated.

At step 206, the system provides media backgrounds for the exterior portions of the boundaries. A media background may consist of any media or documents which can be accessed in a video communications platform, such as e.g., video, audio, text, presentation documents consisting of a number of slides, or a game or other interactive interface or component. In some embodiments, the media background is received as a selection by a user from a pre-defined set of media backgrounds, or may be automatically provided as a default media background. For example, by default the media background may be a solid grey background, but a user can pick from a selection of pre-existing media backgrounds stored locally or on the cloud. In some cases, a user may download or otherwise retrieve a media background from an external source, or generate a media background themselves, then import it into the video communications platform. In some embodiments, a presentation including a number of slides may be selected as a media presentation. The presentation can depict one slide at a time in a slideshow format, with the user clicking or performing some other action to progress to the next slide. In some embodiments, the media background may be a video, such as a short movie which can be played back such that the video plays at the same time for all users participating in the video session. In some embodiments, the media background may be, e.g., a word processor document or spreadsheet document, a web site, a PDF document, or any other suitable viewable material. In some embodiments, the media background is dynamically generated in real time during the video session.

At step 208, the system generates, for display on one or more client devices associated with the first user and/or additional users, composite videos each depicting the corresponding media background in a first layer and the user in a second layer, where the second layer is overlaid on top of the first layer. The composite video functions to construct a single video out of 1) the interior portion of the boundary which depicts the user from the video content, and 2) the media background which was provided for the exterior portion of the boundary from step 206. The media background appears behind the user. The background for the video content, which was the backdrop behind the user in the video content, is replaced by the media background. The resulting effect is that the user appears as though he is seamlessly placed on top of the media background, with the initial backdrop of the video content not present. In some cases, the media background is much larger than the video content, and the video content appears within a sub portion of the media background.

In some embodiments, the composite video can be generated using any of a number of video compositing techniques and processes which provide for the layering of several different clips of video over one another to produce a single video. Video compositing techniques and processes may include, e.g., masking, digital image manipulation, background projection, flipping or reversing (e.g., flipping the imagery of the annotations so that the annotations are readable by viewers and do not appear reversed), deep image compositing, alpha compositing, digital matte compositing, computer vision models and algorithms, or any other suitable video compositing techniques and processes.

In some embodiments, the system generates the composite video in real time or substantially real time upon receiving the video content and providing the media background. Thus, there may be scenarios where composite video is generated and provided on the fly in the middle of a presentation. For example, in one situation, the presentation has already started and the presenter has already appeared before viewers, but without any media background. The original backdrop of the video content, e.g., the presenter's room, is still visible behind the presenter. However, the presenter may select a presentation slide for sharing from his screen, as a participant has requested to see it. In some embodiments, upon the presentation slide being provided, the system can automatically perform the steps of the present approach to generate a composite video, with the presenter appearing seamlessly in front of the presentation slide, and with the original backdrop of the presenter's view no longer being visible. This is executed nearly instantly or very soon after the presenter selects the presentation slide, such that the viewers immediately see the presentation slide with the presenter loaded in front of the slide, rather than initially seeing, e.g., just the presentation slide, just the presenter, or both side-by-side.

In some embodiments, the composite videos are generated on a remote server associated with the communication platform. This allows the server to perform the majority of the heavy processing required so that the local client device can allocate its resources to other tasks.

At step 210, the system determines that one or more client devices have annotation permissions, i.e., access rights to annotate a given composite video. In some embodiments, annotation permissions may take the form of, e.g., flags, indicators, or bits indicating a particular permissions setting relating to which users are permitted to annotate specific composite videos. In some embodiments, the annotation permissions data comprises a set of entries in one or more databases which maintain data relating to user permissions. In some embodiments, the annotation inputs are received solely from the user who is currently presenting or hosting, whereas in other embodiments, the annotation inputs are received by one or more additional users who are viewing or participating in the video. In some embodiments, at least one of the annotation inputs is received from at least one of the client devices associated with additional users viewing or participating. In this way, for example, an instructor need not be the only person who can annotate video during a virtual classroom session; the instructor may assign one or more students to have annotation permissions, which can provide additional interaction with students.

At step 212, the system receives annotation inputs corresponding to at least one of the composite videos. In some embodiments, the annotation inputs may be provided via touch or stylus input from one or more client devices. For example, a user may use a stylus to sketch notes on the screen of a client device which is showing a user during a live presentation. As the user sketches notes while broadcasting, the notes are received by the system. In some embodiments, annotation inputs may include, e.g., touch-based annotations, messaging-based annotations (including, e.g., emojis and other symbols), or media-based annotations (such as video, audio, documents, images, drawings, or any other suitable media).

Alternately, the instructor can temporarily allow a student to present before the class, including the student sharing presentation slides and annotating over the slides while the teacher watches. In some embodiments, "breakout rooms" populated by subgroups of participants may be generated, permanently or temporarily splitting the group up into divisions to collaborate or discuss in smaller groups. In some embodiments, such breakout rooms may each have a presenter who can be designated by the subgroup or by the first user, and an annotator who can be designated by the subgroup or by the first user. In some embodiments, the presenter may replace the video of the presenter with video of one or more selected participants, who speak before the other participants using their own client devices to stream the video content. The selected presenter can annotate and present. In some embodiments, the initial presenter may instead make annotations while the new presenter presents. For example, a student may be able to present their homework to the teacher, with the homework being presented as a media background, and the teacher may make annotations and markings on the homework in real time as it is being presented.

In some embodiments, a user with hosting or administration access can assign participants of a single room into separate breakout rooms or subgroups, and each breakout room can have the same media background. In some embodiments, this media background is assigned by the hosting user. In some embodiments, the media background is a video or presentation in which each breakout room is configured to play back the video file in synchronization with the other breakout rooms. In some embodiments, one or more annotators in each group can be assigned by the host user or by other participants, and each breakout room has a different set of annotations from the other rooms. In other embodiments, one single user, such as the first user, can have access rights to annotate over the media background.

In some embodiments, the user is provided with the ability to switch the view on the first user's client device to any one of the composite videos from the subgroups or any combination of a plurality of the composite videos from the subgroups. For example, a teacher may be able to jump between four different breakout rooms via the client device, watching composite videos for each, or may be able to view multiple composite videos at once from the different breakout rooms. In some embodiments, the teacher may opt to view two, three, or all four breakout rooms simultaneously, switching between an audio feed for each as desired. In some embodiments, the hosting teacher may have the ability to remove or add back one or more layers from any of the composite videos from the subgroups.

Many other such possibilities may exist for groups and rooms to have presenters, participants, annotators, and media backgrounds in various configurations.

At step 212, the system updates at least one composite video to additionally depict the annotation inputs within a third layer, where the third layer is overlaid on top of the second layer of the composite video. Upon receiving the annotation inputs in step 210, the system depicts the annotations as though they are overlaid in front of the user. For example, in a live stream, the user may draw on the client device directly on top of a self-view of the user, i.e., the user is watching himself present on the client device in real time. As the user draws, the annotations appear as though they are being drawn directly in front of the user. In some embodiments, the annotations may correspond to the media background, including markings of various parts of the media background. For example, a user may circle a bullet point of interest on the screen while a media background of a presentation slide is being depicted. The system updates the composite video with such annotations in real time, so that viewers and participants see the annotations as they are being sketched out.

In some embodiments, similarly, the system can update the composite video in real time or substantially real time upon receiving the one or more annotation inputs. Upon the presenter annotating the screen, the live stream can update the video available to users instantly or nearly instantly with those same annotations upon the viewable screen being broadcasted on the live stream. In this way, there is no perceptible delay between the presenter writing, sketching, drawing, or typing something onto the screen, and viewers seeing those annotations on their screens.

In some embodiments, the system will perform one or more of steps 202 through 212 periodically, semi-periodically, or continuously such that the system will keep updating the composite video to depict additional annotations as they are received, and will also keep generating composite video as video content is received. In some embodiments, this is done in real time or substantially real time.

In some embodiments, the first user and/or one or more of the additional users watching the video can be provided with the ability to render the annotation inputs as transparent or semi-transparent. The system processes and renders the annotation inputs to appear on the screen as transparent or semi-transparent, rather than the default appearance of full opacity. Such an option may allow users to view any aspects of the media background and/or presenter's image which would otherwise be obscured by the annotations. In some embodiments, the user can turn on this transparency for all users by default. In some embodiments, the additional users watching the presentation can opt to turn the transparency on or off independently of how the annotations are presented to other viewers. In some embodiments, the re-rendering of the annotations is performed and presented in real time or substantially real time upon the option being selected.

In some embodiments, the system periodically or continuously detects a network bandwidth of each of the client devices associated with the additional users. The system then dynamically adjusts the video quality of at least one of the layers of the composite video displayed on at least one of the client devices in real time or substantially real time based on the detected network bandwidth of the client devices. In various embodiments, video quality may include one or more elements such as, e.g., high-definition video, whether audio is compressed and by how much, video resolution, whether processing or filtering is applied to the video, or any other suitable settings for increasing or decreasing video quality.

For example, some participants watching the video may be using suboptimal network connections, or may be traveling somewhere while moving in and out of a signal and connection. In such circumstances, the system can dynamically adjust the quality of the video to compensate for this lowered or suboptimal network bandwidth. In some embodiments, the system may dynamically adjust one layer or two layers, rather than all three layers of the composite video. This may be performed when the system detects that not all of the layers feature content which struggles to load due to suboptimal network bandwidth. The system identifies which layers do present such problems, and lowers the video quality of just those layers, while leaving the others intact.

In some embodiments, the participants can optionally send reports about video quality to the first user, in order to share information about which elements of the composite video are being displayed on their screens with inferior video quality. The system receives a request from the first user in response to these reports, with the first user requesting to adjust the video quality of one or more elements of the composite video identified in the reports as struggling to load or presenting glitches. The system then adjusts, in real time or substantially real time upon receiving the request, the video quality of the one or more elements of the composite video which are identified in the request from the first user. In this way, users can send feedback about problem elements of a streaming presentation while the presentation is occurring, and the presenter or host can take steps to correct the issue in real time while the presentation is underway. This keeps the presentation from being presented in a suboptimal fashion for its entire duration.

In some embodiments, the first user or one of the participants (i.e., additional users) may submit a request to remove the first user from the composite video. The system then updates the composite video such that the first user within the second layer is removed, while the second layer and third layer remain. This provides the ability of a presenter or participants to remove the presenter's image, such that only the media background and annotations are visible. This may be useful in various situations, such as when the full screen is needed to see the media background, or when the presenter no longer wishes to be visible within the presentation, but prefers to present the materials by themselves with annotations.

In some embodiments, the system can receive a selection to replace the first user within the second layer of the composite video with the images or video of one or more additional users who are participating in the video. The system updates the composite video such that the imagery of the first user within the first layer is replaced with the imagery of the one or more additional users.

At step 216, the system updates the composite video to depict the additional pieces of video content within one or more layers of the composite video. In some embodiments, the system uploads and/or caches the video content before depicting it within the composite video. In some embodiments, the additional video content can appear in the first layer of the composite video, i.e., within the same layer as the media background. Thus, a portion of the media background may be obscured where the additional video contact is located. In some embodiments, the user who selected the content can reposition or resize it to adjust the location and size and to ensure that it does not block any key content within the media background.

In some embodiments, in response to one or more selections to generate a recording of the session, the system captures a fixed recording of the session, wherein the composite videos and layers available to one of the client devices during the session is captured to the fixed recording. For example, a fixed recording can be generated such that the recording is made through the "eyes of the user" associated with the client device. The recording plays back the composite videos with the layers which the user selected when the user was watching the composite videos during the live session.

In some embodiments, in response to one or more selections to generate a recording of the session, the system, the system captures a dynamic recording of the session, wherein a client device playing back the dynamic recording can dynamically switch between different layers, composite videos, and/or annotations in real time or substantially real time. In some embodiments, the dynamic recording is generated such that one or more layers may be interacted with to be exposed or removed during playback of the recording, such that a user playing back the recording can add or remove layers to various composite videos according to the user's needs and/or preferences.

Figure 2B:
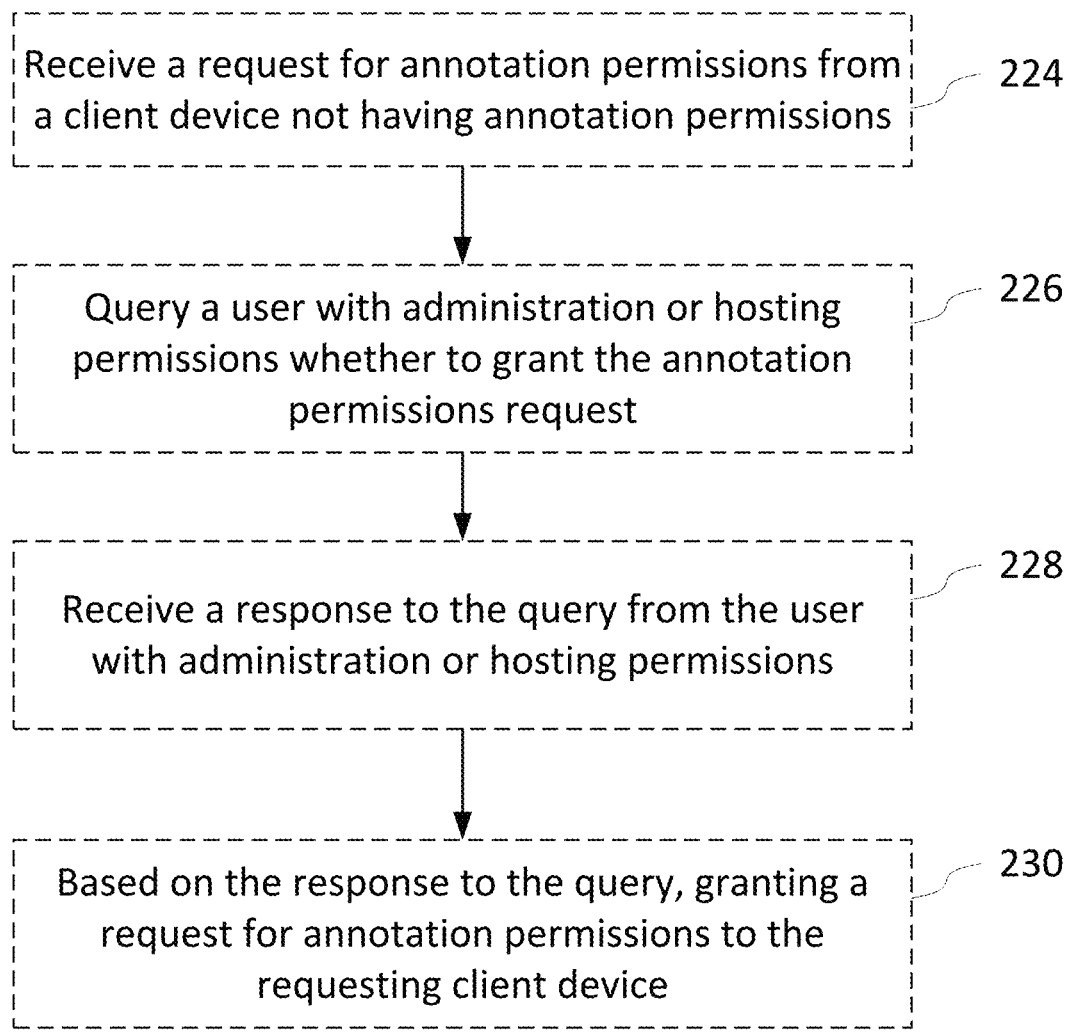
FIG. 2B is a flow chart illustrating an exemplary method 220 that may be performed in some embodiments.

FIG. 2B is a flow chart illustrating another exemplary method 220 that may be performed in some embodiments.

At optional step 224, the system receives a request for annotation permissions from a client device not having annotation permissions. This request for annotation permissions may take the form of engaging with a UI element, submitting a form, or any other suitable form of engagement within the video. In some embodiments, the user includes a specific composite video or videos for which annotation permissions are being requested.

At optional step 226, the system queries a user with administration or hosting permissions whether to grant the annotation permissions request. In some embodiments, the system sends a notification to the hosting user which asks for a response for whether to grant annotation permissions to the client device. In some embodiments, details regarding the request, the user, and other information may be accessible to the hosting user in order to receive enough visibility into the details of the request to be able to respond. In some embodiments, a dashboard or similar UI is presented.

At optional step 228, the system receives a response to the query from the user with administration or hosting permissions. The response includes an affirmative or negative response to the query.

At optional step 230, based on the response to the query, the system grants a request for annotation permissions to the requesting client device. In some embodiments, upon granting the request, the system sends a notification to the requesting user that the request has been approved. Upon receiving annotation permissions, the user can now provide annotations over one or more composite videos that were specified.

In some embodiments, at least one of the additional pieces of video content depicts imagery of an additional user, material presented by an additional user, or a combination thereof. Many such possibilities may exist for participants other than the initial presenter to present their own images and video of themselves, their own media backgrounds (including, e.g., PDFs, video, interactive elements, websites, or any other suitable media backgrounds), or some combination of the two.

In some embodiments, the selection of the additional pieces of video content is received from either the first user or one of the additional users. For example, in a classroom setting, a teacher may request a group of users to present a short film they have created. In response, one of the users selects a video file from a cloud storage which contains the short film. The class can then watch the short film together while one or more of the presenting students annotates to point out different aspects of the film.

Figure 2C:
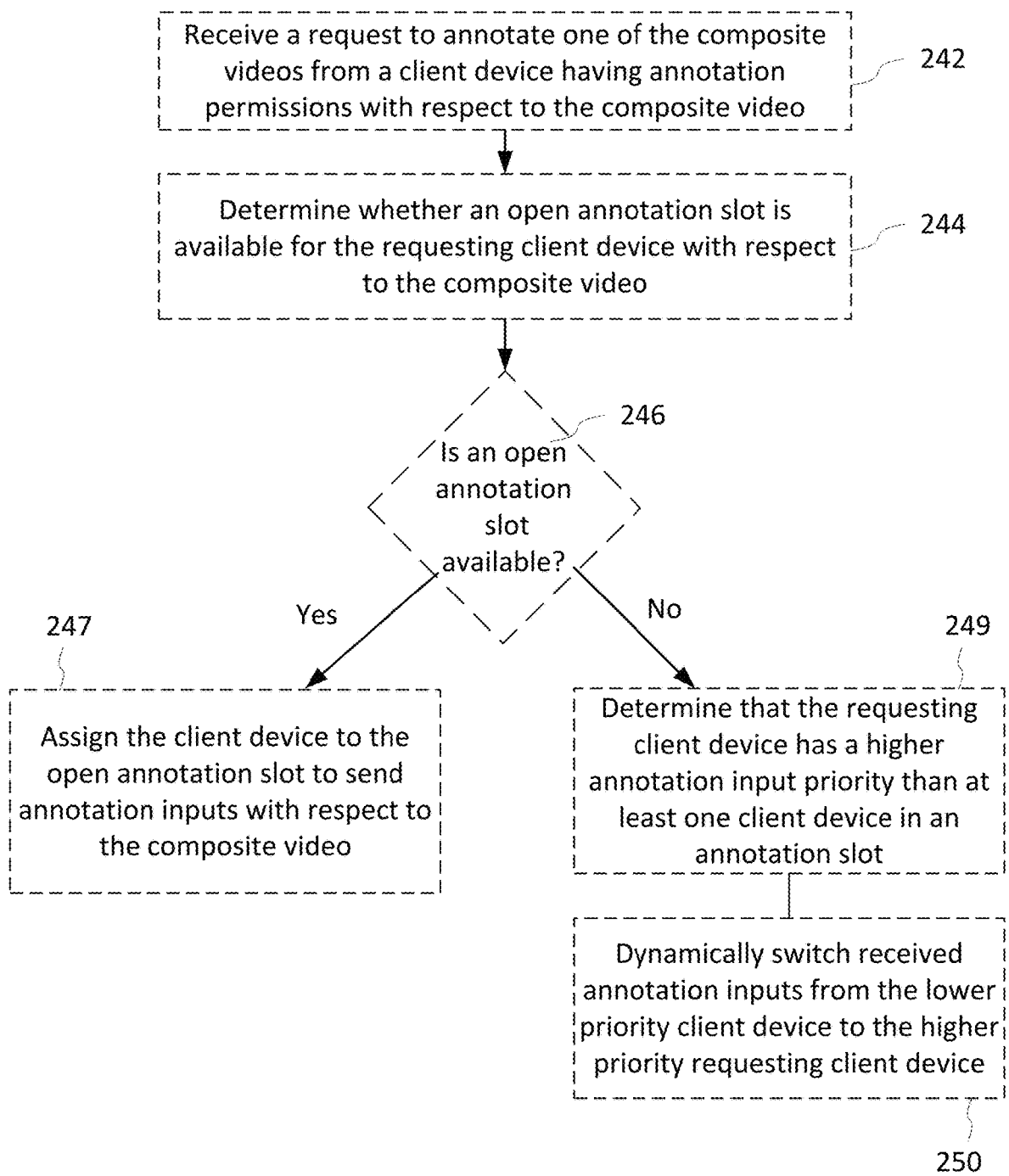
FIG. 2C is a flow chart illustrating an exemplary method 240 that may be performed in some embodiments.

FIG. 2C is a flow chart illustrating another exemplary method 240 that may be performed in some embodiments.

At optional step 242, the system receives a request to annotate one of the composite videos from a client device having annotation permissions with respect to the composite video. In some embodiments, the request can take the form of a submitted form, engagement with a UI element, or any other suitable form of request within the video communication platform.

At optional step 244, the system determines whether an open annotation slot is available for the requesting client device with respect to the composite video. In some embodiments, annotation slots can be allocated for each of the composite videos within the video session. Annotation slots can be assigned to users by one or more users with hosting and/or administration access. If a user is assigned to an annotation slot, the user receives annotation permissions for annotating the specific composite video in question. In some embodiments, each composite video is associated with a finite number of annotation slots. For example, a composite video may have a maximum of three annotators at a time, and thus only three annotation slots are available.

At decision point 246, in relation to step 244, the system determines whether an open annotation slot is available. If yes, then we proceed to step 247. If no, then we proceed to step 249.

At optional step 247 wherein an open annotation slot is available, the system assigns the client device to the open annotation slot to send annotation inputs with respect to the composite video. The system can assign such a client device through approval of a user with hosting or administration access, or can assign the slot automatically without involving a user.

At optional step 249 wherein an open annotation slot is not available, the system determines that the requesting client device has a higher annotation input priority than at least one client device in an annotation slot. In some embodiments, annotation input priorities can be assigned to one or more users within the video session. Annotation input priority can refer to a state of taking precedence over other users in annotating aspects of one or more compositive videos. In some embodiments, a user with host or administration access can assign annotation input priorities to users, which may appear as numbered rankings, weights, percentages, numerical scores, or other quantifications of annotation input priority.

At optional step 250, the system dynamically switches received annotation inputs from the lower priority client device to the higher priority requesting device. In some embodiments, the system may provide some request or warning to the lower priority client device that their annotation permissions will expire within a set number of minutes. Upon the user's permissions expiring, the higher priority requesting device is then granted the open annotation slot, and may proceed to annotate the composite video.

Figure 3:
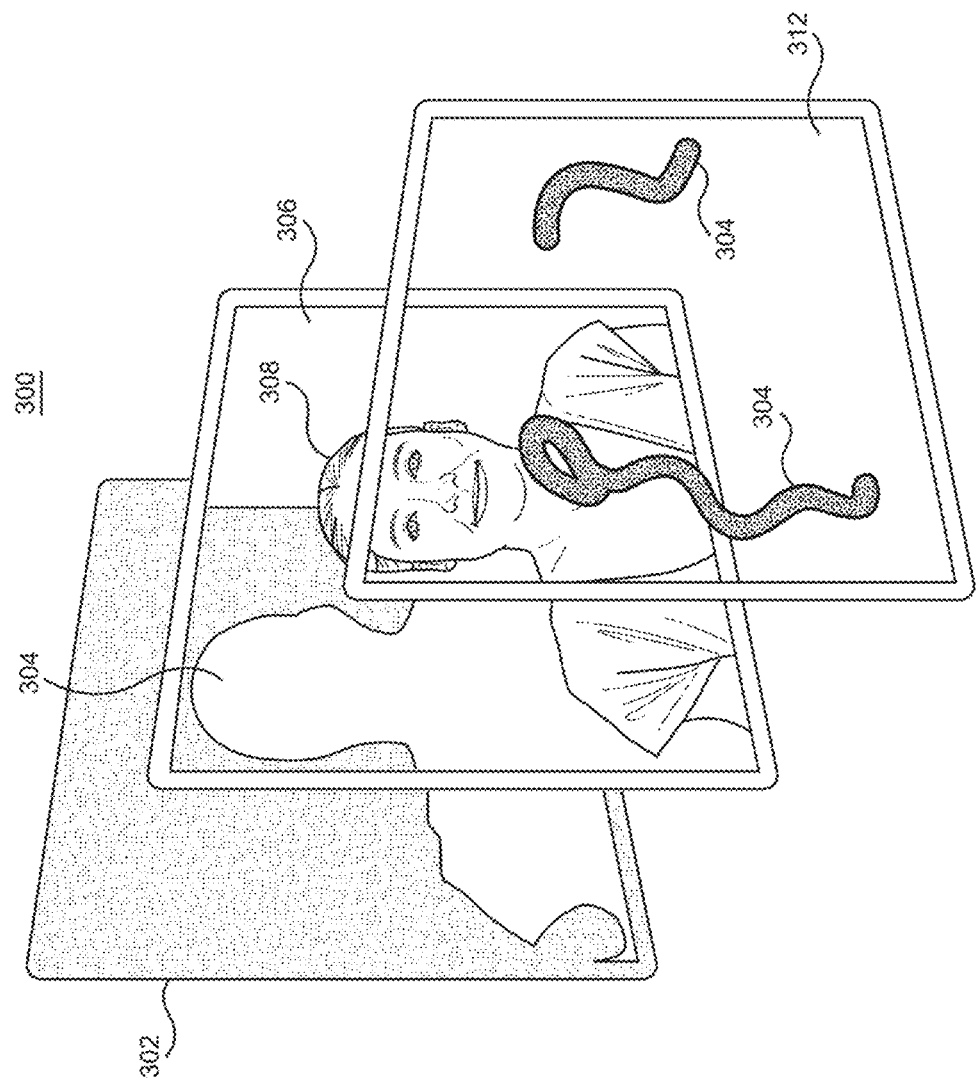
FIG. 3 is a diagram illustrating one example embodiment 300 of providing live annotations over a presenter in self-view, in accordance with some embodiments.

FIG. 3 is a diagram illustrating one example embodiment 300 of providing live annotations over a presenter in self-view, in accordance with some embodiments. As illustrated in FIG. 2A and the description above, the system receives video content depicting imagery of a first user. The system then determines a boundary about the first user in the video frames, where the boundary has an interior portion and an exterior portion. The system provides a media background for the exterior portion, and then generates a composite video depicting the media background in a first layer and the first user in a second layer, with the second layer overlaid on top of the first layer.

As illustrated in the example embodiment 300, a composite video is generated consisting of a first layer 302, a second layer 306, and a third layer 312. The video content depicting imagery of the first user can be seen in user image 308. The original backdrop of the video content has been removed, and the imagery of the first user remains. An image mask 304 of the first user shows a determined boundary around the outline of the first user, where the white section represents the interior portion of the boundary and the black section represents the exterior portion. After the system determines the boundary about the user, the system provides a media background for the exterior portion of the boundary. The media background may be a default media background, a media background selected by the user, or some other suitable media background. In this example, the media background is determined to be a default black background. The black media background is provided around an exterior portion of the image mask 304.

After the media background is received, the system generates a composite video for display on one or more client devices associated with the first user, one or more additional users, or a combination thereof. The composite video consists of a first layer 302, which contains the media background at the exterior portion of the boundary as well as the image mask 304 at the interior portion of the boundary; and a second layer 306, which contains the imagery of the user from the video content, with the backdrop of the video content removed. The resulting composite video appears to viewers such that the video depicting the user is overlaid on top of the media background, creating the appearance of the user being placed seamlessly in front of the media background.

As described above with respect to FIG. 2, steps 210 and 212, the system receives annotation inputs corresponding to the composite video, and then updates the composite video to additionally depict the annotation inputs within a third layer. The annotation inputs 304 are illustrated within a third layer 312. In some embodiments, while the first user can see a self-view mode on their client device as presenter during a video stream, the user can interact with an "Annotation" UI element, such as a button, menu or submenu item, or icon within a toolbar. Upon interacting with this UI element, the user is provided with a set of tools for annotating the video shown in self-view mode. The user may use a stylus or pen, or simply touch input with fingers to draw annotations directly on the screen. The user may also type text within text boxes which can appear on the screen, generate geometric objects, lines, and more, adjust characteristics of the stylus, pen, or touch input (e.g., input weight, color, and type of virtual writing implement), and otherwise provide annotation input in various ways.

The composite video updates in real time or substantially real time upon the annotation inputs being received, and the annotations appear within the third layer. The third layer appears overlaid on top of the second layer where the imagery of the first user is located. Thus, as illustrated, when viewers see the video, it appears to them as though the annotations are drawn in front of the user as the user speaks and moves around, with the media background seamlessly appearing behind the user.

Figure 4A:
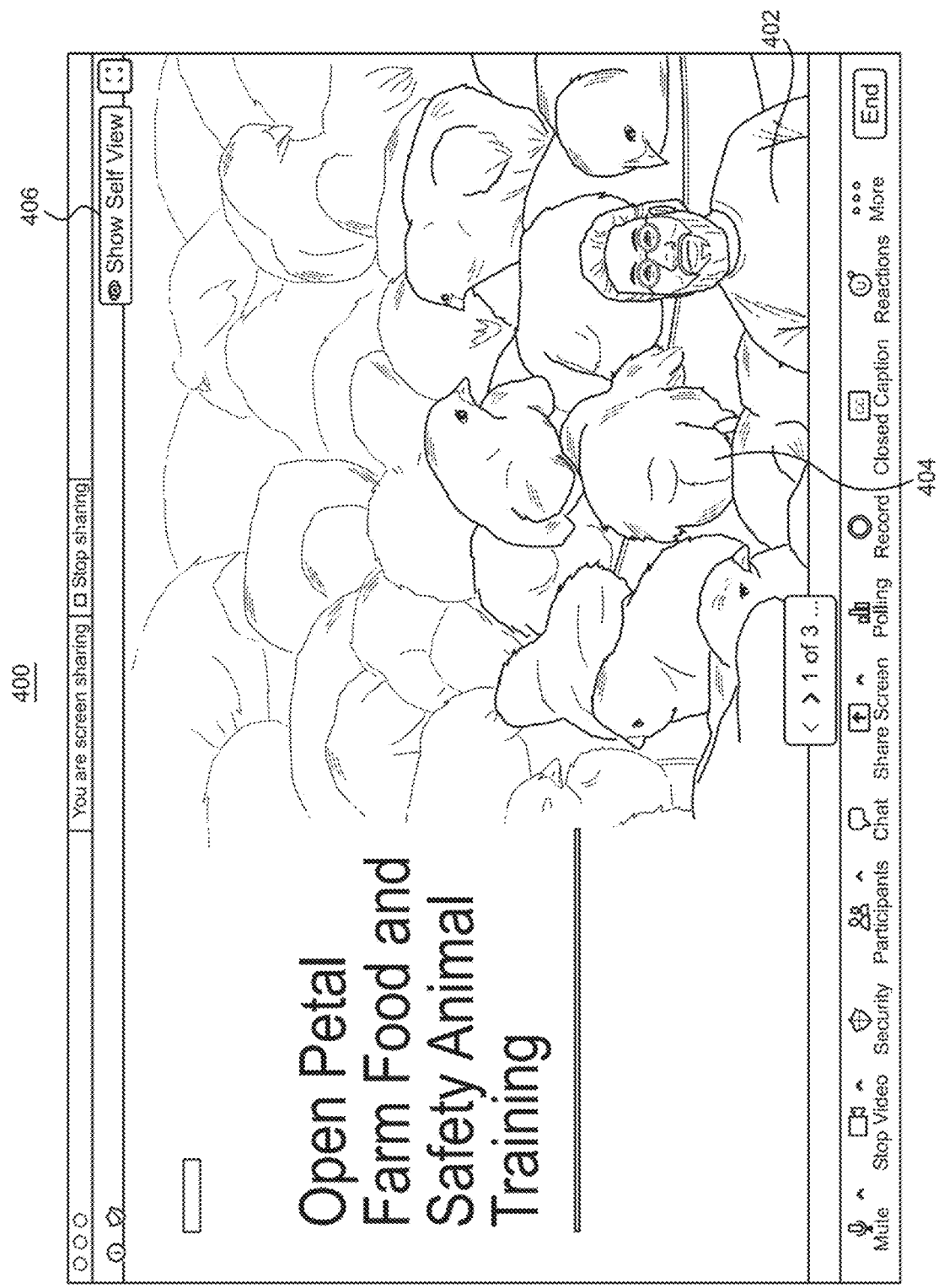
FIG. 4A is a diagram illustrating one example embodiment 400 of a presenter's video appearing overlaid on a media background, in accordance with some embodiments.

FIG. 4A is a diagram illustrating one example embodiment 400 of a presenter's video appearing overlaid on a media background, in accordance with some embodiments. Within the example embodiment 400, a presenter 402 is giving a live streaming presentation. Behind the video of the presenter 402 is a media background 404. The media background 404 is provided as a presentation consisting of a number of slides. The presentation slide was selected by the presenter from a local storage drive of the presenter's client device. The title slide is depicted in the example as the presenter speaks in front of the slide. The presenter can thus have the convenience of gesturing toward parts of the slide or otherwise presenting with the benefit of both the presenter and the slide being visible on one screen. The screen illustrated in the example embodiment is the screen visible to the presenter on the presenter's client device. The screen view is currently showing the view as it would be visible to viewers. A "Show Self View" UI element 406 allows the presenter to toggle instead to a self-view mode, where the screen depicts the user's image more closely or exclusively, with the media background either not being present, or not being fully visible.

In some embodiments, the first user (i.e., the presenter) appears overlaid on a sub portion of the media background within the composite video. This is illustrated in the example embodiment, as the presentation slide shown in the media background is much larger in size than the view of the user, which can only be seen in one corner of the media background. Thus, the media background need not be the same size or dimensions as the video content depicting the user. Rather, then media background can potentially be much larger, regardless of the size or dimensions of the media background, however, the user will still appear as though he is seamlessly standing in front of the media background.

Figure 4B:
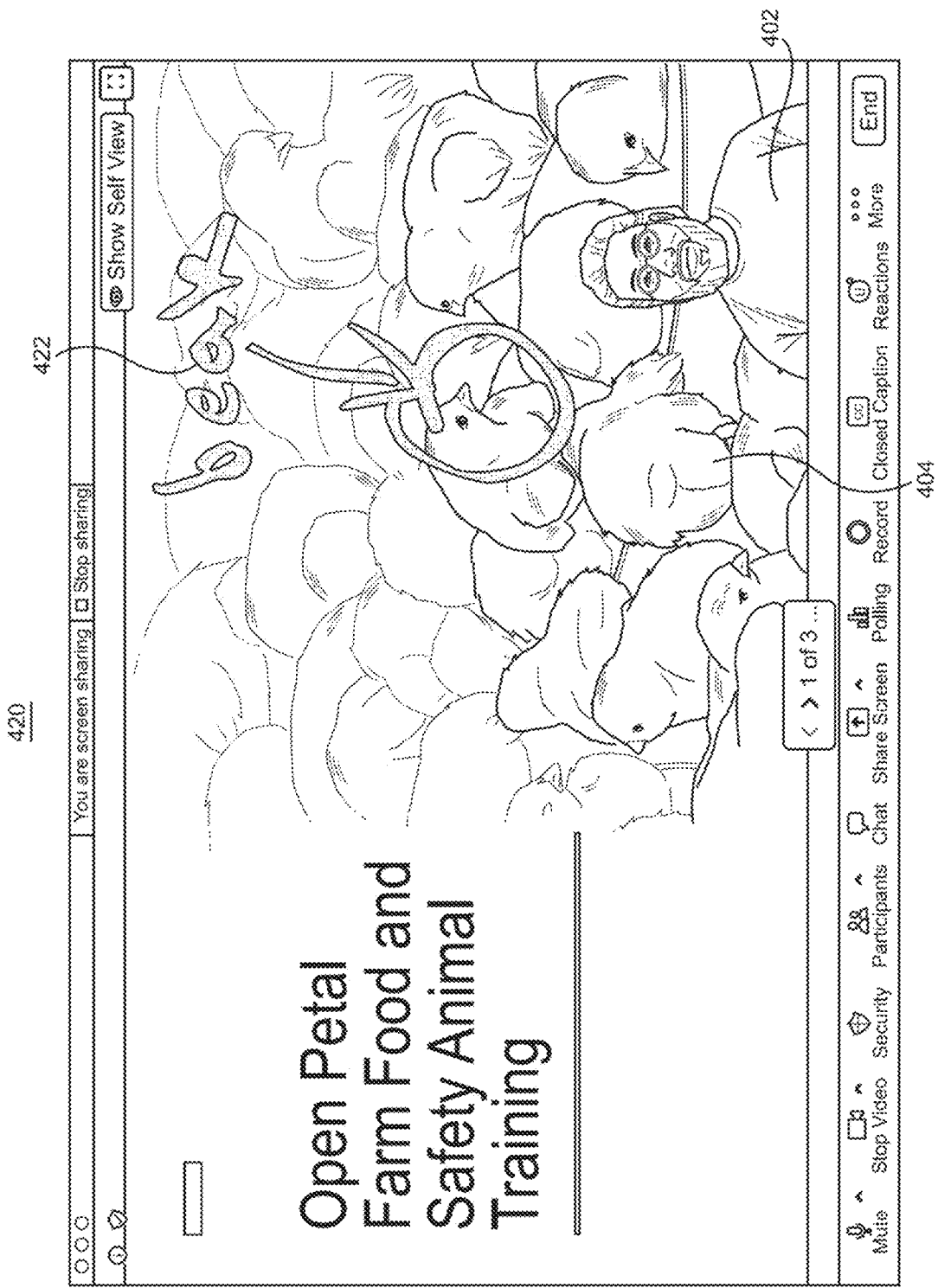
FIG. 4B is a diagram illustrating one example embodiment 420 of a presenter providing live annotations over a media background, in accordance with some embodiments.

FIG. 4B is a diagram illustrating one example embodiment 420 of a presenter 402 providing live annotations 422 over a media background 404, in accordance with some embodiments. The example embodiment 420 depicts the same live streaming presentation as the example embodiment 400 from FIG. 4A, with the presenter's image 402 appearing overlaid on top of the media background 404, which is a title slide of a presentation. The presenter has selected an annotation tool UI element within the interface presented, which allows the presenter to annotate the view presented to the viewers. In this example, the presenter has a smart pen which can be used in conjunction with a tablet as the client device. The presenter chooses an annotation color of white, and a medium weight to the annotations. The presenter has then provided annotation input with the pen on the client device, which is received by the system. The system then updates the composite video to include annotations 422 in the same location of the video as where the presenter provided the annotation inputs on the screen. As illustrated, the annotations ca n helpfully allow the presenter to circle a key portion of the presentation slide, draw a label and an arrow, and more. In this way, the presenter can directly annotate visible elements of the media background. In some embodiments, the annotations may appear in front of the presenter, as though the presenter is drawing directly on a transparent surface in front of him.

Figure 4C:
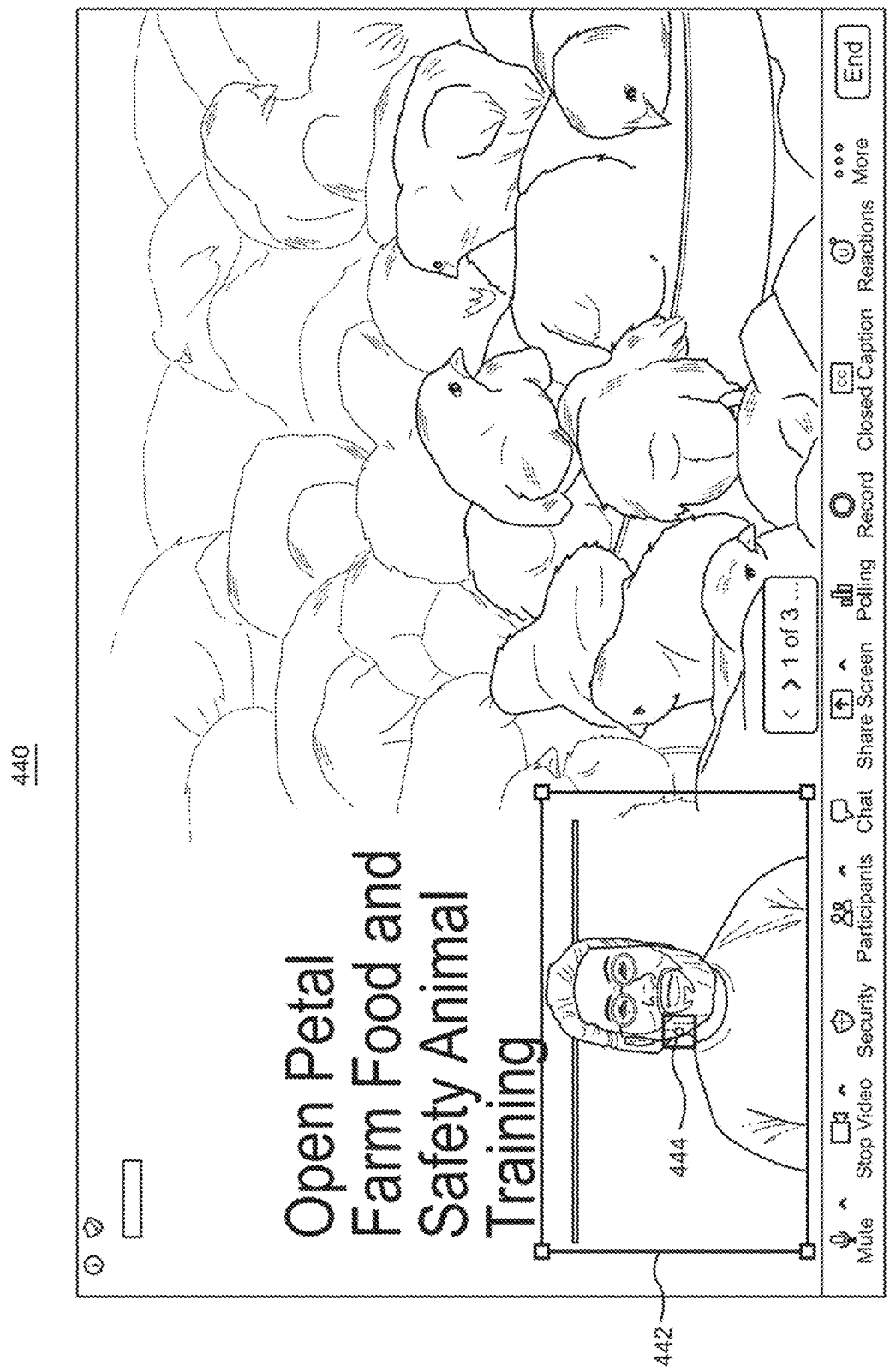
FIG. 4C is a diagram illustrating one example embodiment 440 of a presenter's video being repositioned over a media background, in accordance with some embodiments.

FIG. 4C is a diagram illustrating one example embodiment 440 of a presenter's video being repositioned over a media background, in accordance with some embodiments. The example embodiment 440 illustrates the same live streaming presentation scenario as FIG. 4A. After the composite video with the first and second layers is generated and served to the viewers, the presenter may see the result and decide that his image is located in a spot that inconveniently blocks a portion of the media background he is trying to present and make visible. To correct this, the presenter may be given the ability to interact with UI element(s) for adjusting a view window 442 of the presenter. The presenter can manipulate the window by interacting with it directly on the screen of the client device. For example, by clicking on himself, a border around the window is visible. The presenter can then hold and drag a section 444 of the window to reposition the window to a different location, such as on the left side, as illustrated. In some embodiments, the window can be repositioned in real time or substantially real time as the presenter repositions the window while presenting over the live stream.

Figure 4D:
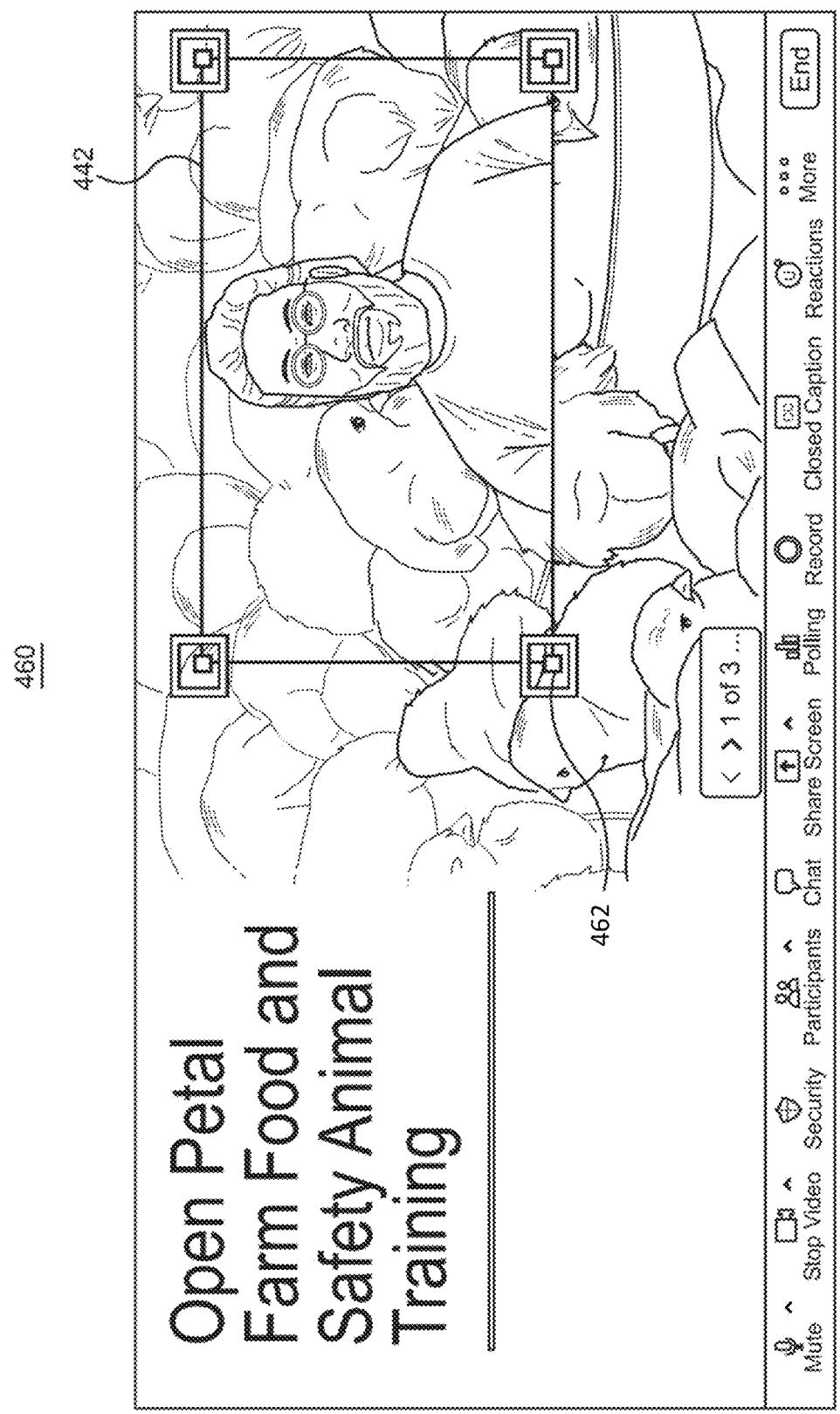
FIG. 4D is a diagram illustrating one example embodiment 460 of a presenter's video being resized over a media background, in accordance with some embodiments.

FIG. 4D is a diagram illustrating one example embodiment 460 of a presenter's video being resized over a media background, in accordance with some embodiments. The view window of the presenter is visible, as is the media background showing a title screen of a presentation. Upon clicking on the image of himself or otherwise interacting with it on the client device, the view window appears with visible border lines. The window also shows four corner window elements 460 which can be interacted with. The presenter can optionally hold and drag one of the four corners window elements 460 of the window to resize the window, thus making the presenter appear larger in the video as he presents in front of the media background and behind any annotations which are visible. The resizing of the window can be done in real time or substantially real time, such that the image of the presenter is resized in real time while the presenter is presenting over the live stream presentation.

Figure 5:
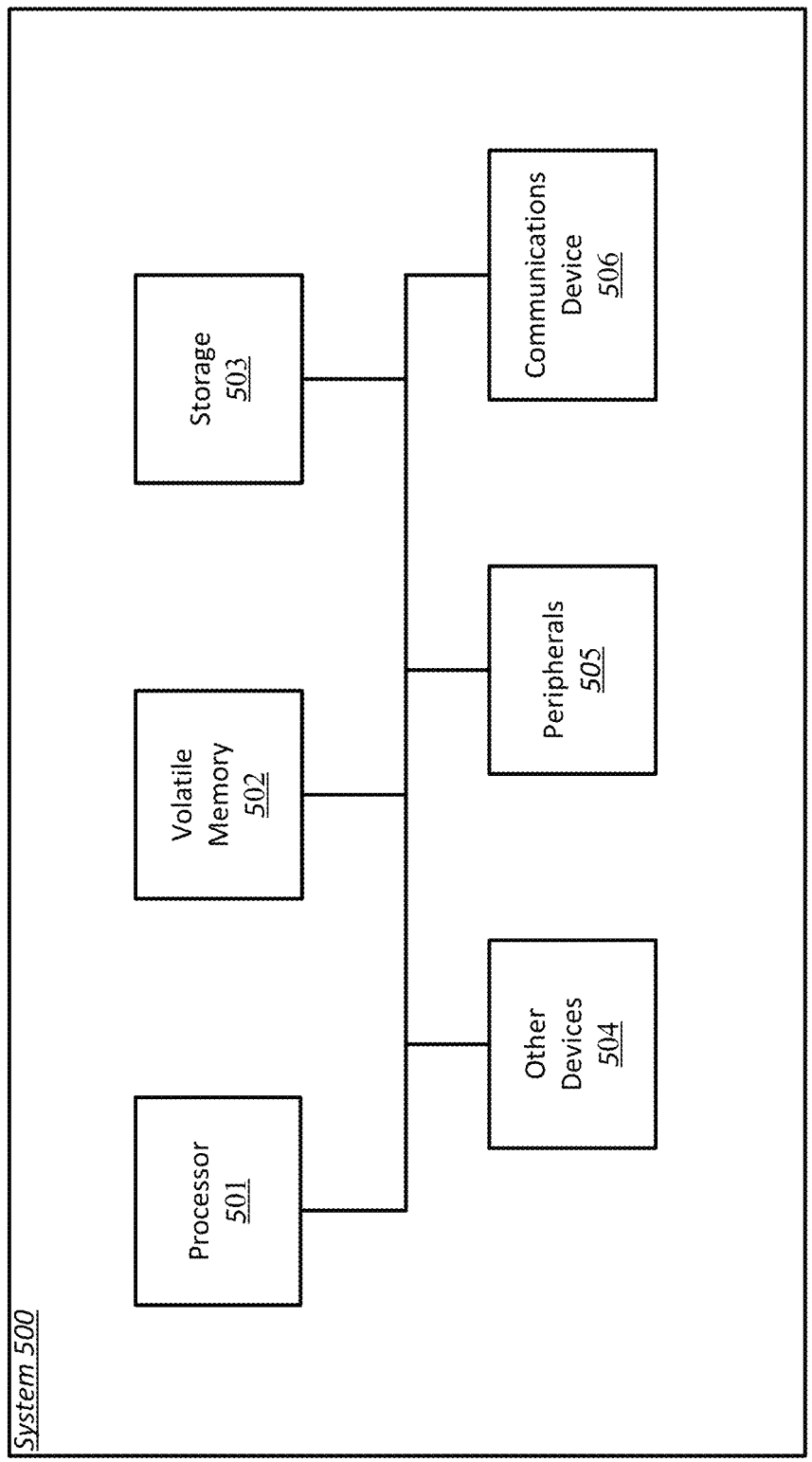
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage.

Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   receiving a video feed within a video session on a communication platform;
   determining a boundary associated with a first user in the video feed, wherein the boundary has an interior portion and an exterior portion, wherein the interior portion includes the first user;
   generating a composite video comprising the interior portion as a first layer, a media background as a second layer, and annotation inputs as a third layer;
   independently adjusting a video quality of each of the first layer, the second layer, and the third layer based on a detected network bandwidth of each client device of one or more client devices; and
   causing the composite video to be displayed at the one or more client devices, wherein each client device is configured to adjust which layers of the composite video are displayed at that client device.

2. The method of claim 1, further comprising:
   causing the media background to be displayed at the one or more client devices in front of the exterior portion and behind the first user.

3. The method of claim 1, wherein a host of the video session is enabled to override independent layer adjustments of each client device.

4. The method of claim 1, further comprising:
   causing the annotation inputs to be displayed at the one or more client devices in front of the media background but not in front of the interior portion.

5. The method of claim 1, wherein a host of the video session is enabled to remove annotation inputs corresponding to one user device from the composite video.

6. The method of claim 1, wherein the media background comprises a first media background received from a first user device and a second media background received from a second user device.

7. The method of claim 6, wherein a host of the video session is enabled to provide annotations over both the first media background and the second media background, and wherein the host is enabled to independently adjust annotation privileges over the first media background and annotation privileges over the second media background.

8. The method of claim 6, wherein the interior portion comprises a second user, wherein the first media background overlays the exterior portion about the first user, and wherein the second media background overlays the exterior portion about the second user.

9. The method of claim 1, wherein each client device is configured to independently adjust a transparency of the annotation inputs being displayed.

10. The method of claim 1, further comprising:
    receiving a request to remove the first user from the composite video; and
    removing the first user from the composite video.

11. The method of claim 10, wherein the request is received by a host of the video session.

12. The method of claim 10, wherein the request is received from the first user.

13. The method of claim 10, wherein the request is received from a non-presenting participant.

14. The method of claim 1, further comprising:
    generating a dynamic recording comprising the composite video, wherein each layer of the composite video is independently configurable during playback of the dynamic recording.

15. An apparatus, comprising:
    a memory; and
    a processor configured to execute instructions stored in the memory to:
    receive a video feed within a video session on a communication platform;
    determine a boundary associated with a first user in the video feed, wherein the boundary has an interior portion and an exterior portion, wherein the interior portion includes the first user;
    generate a composite video comprising the interior portion as a first layer, a media background as a second layer, and annotation inputs as a third layer;
    independently adjust a video quality of each of the first layer, the second layer, and the third layer based on a detected network bandwidth of each client device of one or more client devices; and
    causing the composite video to be displayed at the one or more client devices, wherein each client device is configured to adjust which layers of the composite video are displayed at that client device.

16. The apparatus of claim 15, wherein the instructions are further executable to generate a dynamic recording comprising the composite video, wherein each layer of the composite video is configurable during playback of the dynamic recording.

17. The apparatus of claim 15, wherein a host is enabled to independently adjust annotation privileges over a first media background and annotation privileges over a second media background.

18. A non-transitory computer readable medium storing instructions operable to cause one or more processors to perform operations comprising:
    receiving a video feed within a video session on a communication platform;
    determining a boundary associated with a first user in the video feed, wherein the boundary has an interior portion and an exterior portion, wherein the interior portion includes the first user;
    generating a composite video comprising the interior portion as a first layer, a media background as a second layer, and annotation inputs as a third layer;

independently adjusting a video quality of each of the first layer, the second layer, and the third layer based on a detected network bandwidth of each client device of one or more client devices; and causing the composite video to be displayed at the one or more client devices, wherein each client device is configured to adjust which layers of the composite video are displayed at that client device.

19. The non-transitory computer readable medium of claim 18, wherein a host of the video session is enabled to remove annotation inputs corresponding to each user device from the composite video.

20. The non-transitory computer readable medium of claim 18, wherein the media background comprises a first media background received from a first user device and a second media background received from a second user device.

* * * * *